United States Patent
Jung et al.

(10) Patent No.: US 8,811,340 B2
(45) Date of Patent: Aug. 19, 2014

(54) METHOD FOR PERFORMING HANDOVER TO REDUCE INTERRUPTION TIME

(75) Inventors: In Uk Jung, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 570 days.

(21) Appl. No.: 12/921,146

(22) PCT Filed: Mar. 9, 2009

(86) PCT No.: PCT/KR2009/001162
§ 371 (c)(1),
(2), (4) Date: Sep. 3, 2010

(87) PCT Pub. No.: WO2009/110774
PCT Pub. Date: Sep. 11, 2009

(65) Prior Publication Data
US 2011/0013596 A1 Jan. 20, 2011

Related U.S. Application Data

(60) Provisional application No. 61/034,496, filed on Mar. 7, 2008.

(30) Foreign Application Priority Data

Jul. 14, 2008 (KR) .................. 10-2008-0068206

(51) Int. Cl.
*H04W 4/00* (2009.01)
(52) U.S. Cl.
USPC ........... 370/331; 370/310; 370/328; 370/329; 370/330
(58) Field of Classification Search
None
See application file for complete search history.

(56) References Cited

U.S. PATENT DOCUMENTS

| | | | |
|---|---|---|---|
| 2005/0192011 A1* | 9/2005 | Hong et al. | 455/440 |
| 2005/0197124 A1* | 9/2005 | Kang et al. | 455/439 |
| 2005/0250499 A1* | 11/2005 | Lee et al. | 455/437 |
| 2005/0282548 A1* | 12/2005 | Kim et al. | 455/436 |
| 2006/0146753 A1 | 7/2006 | Park et al. | |
| 2007/0037576 A1* | 2/2007 | Subramanian et al. | 455/436 |
| 2008/0026760 A1 | 1/2008 | Park et al. | |
| 2008/0080426 A1* | 4/2008 | Kim et al. | 370/331 |
| 2008/0125127 A1* | 5/2008 | Hwang | 455/436 |
| 2008/0139207 A1* | 6/2008 | Son et al. | 455/437 |
| 2008/0182579 A1* | 7/2008 | Wang et al. | 455/436 |
| 2009/0111470 A1* | 4/2009 | Thakare | 455/436 |
| 2009/0131056 A1* | 5/2009 | Bontu et al. | 455/436 |

FOREIGN PATENT DOCUMENTS

KR  10-2007-0046404   5/2007

* cited by examiner

*Primary Examiner* — Hassan Phillips
*Assistant Examiner* — Gautam Sharma
(74) *Attorney, Agent, or Firm* — Lee, Hong, Degerman, Kang & Waimey

(57) ABSTRACT

A method for performing handover to reduce an interruption time is disclosed. A method for performing handover using a variable uplink grant time comprises transmitting a handover request message to a base station, receiving a handover response message from the base station, the handover response message including an uplink grant time, and receiving an uplink grant from the base station if the uplink grant time comes, and transmitting a handover indication message to the base station. Thus, an unnecessary interruption time during hard handover can be reduced by efficiently improving use of an action time, and an action suitable for a frame structure of the IEEE 802.16m can be performed.

6 Claims, 5 Drawing Sheets

METHOD FOR PERFORMING HANDOVER TO REDUCE INTERRUPTION TIME

CROSS-REFERENCE TO RELATED APPLICATIONS

This application is the National Stage filing under 35 U.S.C. 371 of International Application No. PCT/KR2009/001162, filed on Mar. 9, 2009, which claims the benefit of earlier filing date and right of priority to Korean Application No. 10-2008-0068206, filed on Jul. 14, 2008, and also claims the benefit of U.S. Provisional Application Ser. No. 61/034,496, filed on Mar. 7, 2008, the contents of all of which are incorporated by reference herein in their entirety.

DESCRIPTION

1. Technical Field

The present invention relates to a handover procedure, and more particularly, to a method for performing handover to reduce an unnecessary communication interruption time during hard handover by efficiently improving use of an action time.

2. Background Art

The existing IEEE 802.16e handover includes a hard handover scheme and a soft handover scheme of MDHO/FBSS. The soft handover scheme such as MDHO and FBSS is optionally provided due to overhead. The hard handover scheme, which is performed more basically than the soft handover, has received much attention. In this respect, various hard handover schemes have been suggested.

The existing IEEE 802.16e network supports efficient hard handover (HHO) through fast ranging. According to a fast ranging scheme, a mobile station performs handover without ranging through possible CDMA codes, by using information collected with respect to a target base station (TBS).

FIG. 1 is a signal flow chart illustrating a hard handover procedure using fast ranging according to the related art. A handover procedure using fast ranging in IEEE 802.16e is illustrated in FIG. 1.

First of all, a mobile station (MS) transmits a handover request message (MOB_MSHO-REQ) to a serving base station (SBS) (110). Then, the serving base station transmits a handover request (HO-REQ) to a target base station (120) and receives a handover response (HO-RSP) from the target base station (130).

The serving base station reports the time when a fast ranging information element (Fast_Ranging-IE) will be transmitted to the mobile station through an action time field of a handover response message (MOB_MSHO-RSP) (140). If the handover response (MOB_MSHO-RSP) message is received, the mobile station starts uplink buffering (145).

In order to reduce communication interruption time during handover, the mobile station promptly performs handover based on information previously synchronized with the target base station through the fast ranging information element (Fast_Ranging_IE). To this end, the mobile station receives current information of the target base station as the handover response (MOB_BSHO-RSP) message through the serving base station and prepares a prior procedure for performing handover.

Thus, the mobile station transmits a handover indication (MOB_HO-IND) to the serving base station (150). Afterwards, the mobile station changes communication setting to adapt to the target base station, and waits for an action time to receive the fast ranging information element (Fast_Ranging_IE). In this case, the action time means a scheduled time scheduled to transmit the fast ranging information element (Fast_Ranging_IE) from candidate target base stations to the mobile station.

Meanwhile, if the handover indication (MOB_HO-IND) is received, the base station starts downlink buffering (155).

The mobile station can successfully receive the fast ranging information element (Fast_Ranging_IE) without additional setting (160) and receive uplink (UL) allocation for transmitting ranging request (RNG-REQ).

The action time is calculated by the serving base station using a handover readiness timer and a base station (BS) switching timer.

Finally, if the mobile station transmits a ranging request (RNG-REQ) to the target base station (170) and receives a ranging response (RNG-RSP) from the target base station (180), the mobile station performs communication with the base station with respect to user data.

The aforementioned fast ranging procedure is performed as the mobile station receives necessary ranging parameters through a scanning procedure and a procedure of receiving neighboring advertisement (MOB_NBR-ADV) message.

As described above, general hard handover of the current IEEE 802.16e (WiMAX rel 1.x) is performed in such a manner that the mobile station finishes its authentication through the ranging request (RNG-REQ) and the ranging response (RNG-RSP) and again starts communication after receiving the fast ranging information element (Fast_Ranging_IE).

FIG. 2 is a diagram illustrating a hard handover procedure in view of latency.

In FIG. 2, if each transmission is calculated at 5 ms and processing time 1 TTI (2 ms), a communication interruption time during hard handover becomes 40 ms.

Voice or data occurring due to communication interruption during hard handover are buffered in the mobile station, the serving base station and the target base station, so as to avoid their loss. The mobile station starts buffering from the time when the handover indication (MOB_HO-IND) message to the serving base station, and the serving base station starts buffering from the time when the handover indication (MOB_HO-IND) message is received. After handover is successfully performed, data transmission and reception are performed starting from the buffered data. Afterwards, normal communication is performed.

FIG. 3 is a diagram illustrating unnecessary standby state occurring during a hard handover procedure.

First of all, the mobile station transmits the handover request (MOB_MSHO-REQ) message to the serving base station (310). Then, the serving base station transmits the handover request (HO-REQ) to the target base station (320) and receives the handover response (HO-RSP) from the target base station (330).

The serving base station calculates the action time based on a frame transmission period with the target base station, the handover readiness timer, and the base station switching timer. Then, the serving base station reports the time when the fast ranging information element (Fast_Ranging-IE) is exactly transmitted to the mobile station, to the mobile station through the handover response (MOB_MSHO-RSP) message (340).

However, the mobile station is prepared to receive the fast ranging information element (Fast_Ranging_IE) as soon as possible regardless of the action time. Namely, the mobile station transmits the handover indication (MOB_HO-IND) message to the serving base station after decoding the handover response (MOB_BSHO-RSP) message (350), and is standby to receive the fast ranging information element (Fast_Ranging_IE) by setting a communication status with the target base station.

Afterwards, as illustrated in FIG. 1, the mobile station transmits the ranging request (RNG-REQ) to the target base station (370) and receives the ranging response (RNG-RSP) the target base station (380).

At this time, if the action time becomes long from the standby state after BS switching (base station switching) of the mobile station, the communication interruption time occurs due to the unnecessary standby state (NOOP: no operation) until the action time comes.

DISCLOSURE OF THE INVENTION

Accordingly, the present invention is directed to a method for performing handover to reduce interruption time, which substantially obviates one or more problems due to limitations and disadvantages of the related art.

An object of the present invention is to provide a method for performing handover in a mobile station, in which an action time of hard handover is efficiently used to reduce latency.

Another object of the present invention is to provide a method for performing handover in a base station, which allows a mobile station to efficiently use an action time of hard handover.

To achieve the object and other advantages and in accordance with the purpose of the invention, as embodied and broadly described herein, a method for performing handover at a mobile station using a variable uplink grant time comprises transmitting a handover request message to a base station, receiving a handover response message from the base station, the handover response message including information indicating an uplink grant time, and receiving an uplink grant from the base station when the uplink grant time comes, and transmitting a handover indication message to the base station.

Preferably, the uplink grant time is a delay time in a frame unit.

Preferably, the uplink grant time is determined considering an action time when a fast ranging information element is received from the target base station.

Preferably, the step of transmitting a handover indication message to the base station includes transmitting the handover indication message after the uplink grant time passes from the time when a handover readiness timer ends.

Preferably, the method further comprises receiving a fast ranging information element from a target base station for handover if a base station switching timer ends after transmitting the handover indication message.

In another aspect of the present invention, a method for performing handover at a base station using a variable uplink grant time comprises transmitting a handover response message to a mobile station when a handover request message is received from the mobile station, the handover response message including information indicating an uplink grant time, and transmitting an uplink grant to the mobile station if the uplink grant time comes, and receiving a handover indication message from the mobile station.

Preferably, the method further comprises starting downlink buffering if the handover indication message is received.

Preferably, the uplink grant time is a delay time of a frame unit.

Preferably, the uplink grant time is determined considering an action time when a target base station transmits a fast ranging information element to the mobile station, the mobile station being scheduled to perform handover for the target base station.

Preferably, the step of receiving a handover indication message includes receiving the handover indication message after the uplink grant time passes from the time when a handover readiness timer of the mobile station ends.

According to the embodiment of the present invention, use of action time can efficiently be improved to reduce unnecessary communication interruption time during hard handover. The operation suitable for a frame structure of the IEEE 802.16m can be performed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, the preferred embodiment of the present invention will be described with reference to the accompanying drawings. However, it is to be understood that various modifications can be made in the following embodiment of the present invention, and the scope of the present invention is not limited to the following embodiment.

In the embodiment of the present invention, to satisfy requirements of 30 ms or less for handover (HO) interruption time by reducing a communication interruption time as maximum as possible, there is provided a method of reducing latency by efficiently using a current action time of hard handover. The requirements of 30 ms or less will also be requirements of the IEEE 802.16m. To this end, in the embodiment of the present invention, to reduce the communication interruption time consumed due to a standby state during hard handover, there is provided a method for coordinating the time when a handover indication (MOB_HO-IND) message is transmitted to the time before the action time. In this case, a serving base station and a mobile station can perform communication for a longer time.

To efficiently perform hard handover to adapt to an action time using a fast ranging information element (Fast_Ranging_IE), the present invention suggests a method for implicitly transmitting a handover indication (MOB_HO-IND) message.

Figure 1:
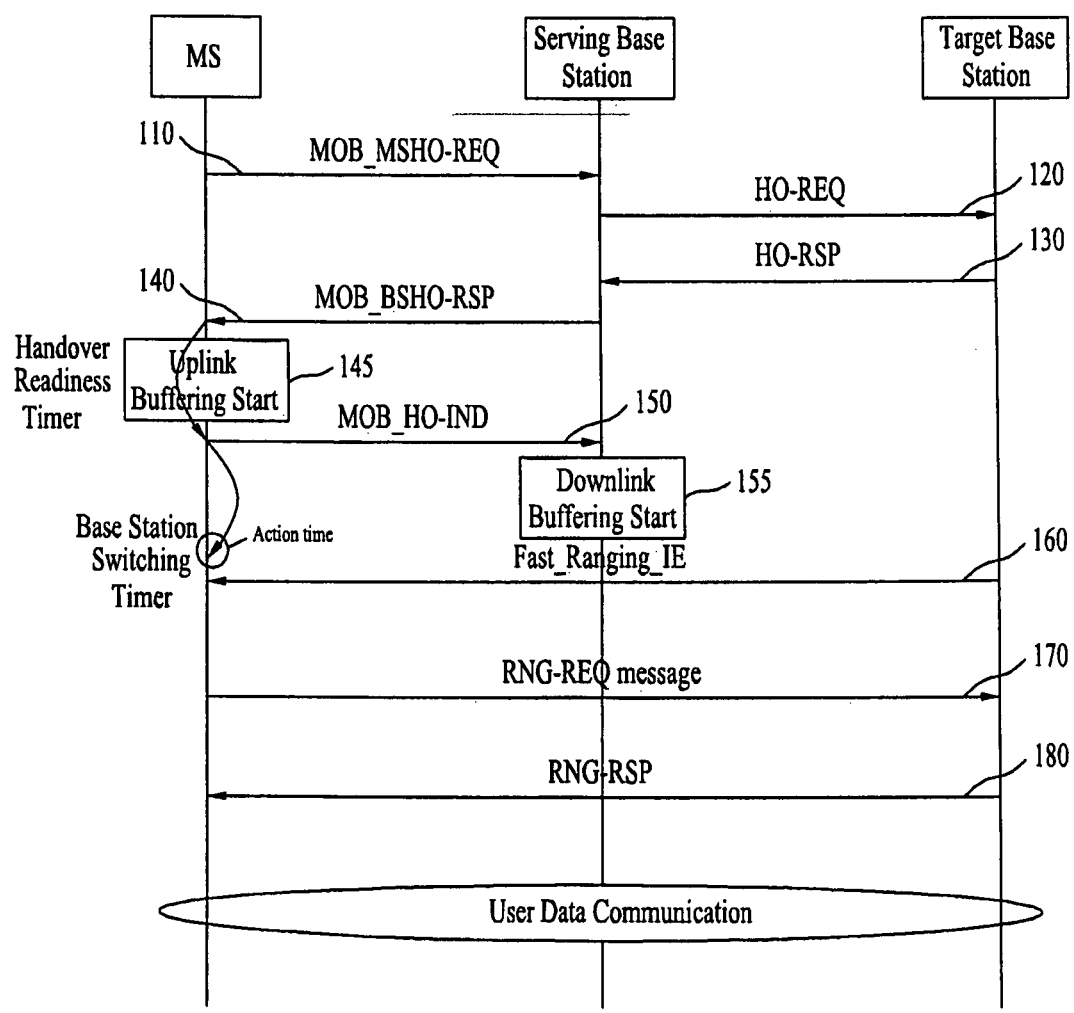
FIG. 1 is a signal flow chart illustrating a hard handover procedure using fast ranging according to the related art.
Figure 2:
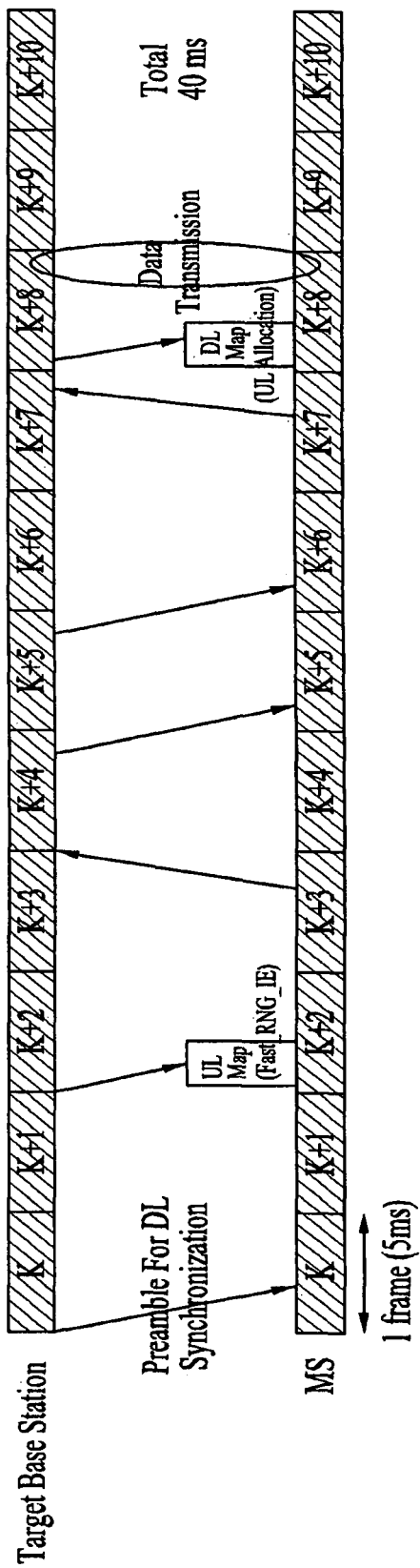
FIG. 2 is a diagram illustrating a hard handover procedure in view of latency.
Figure 3:
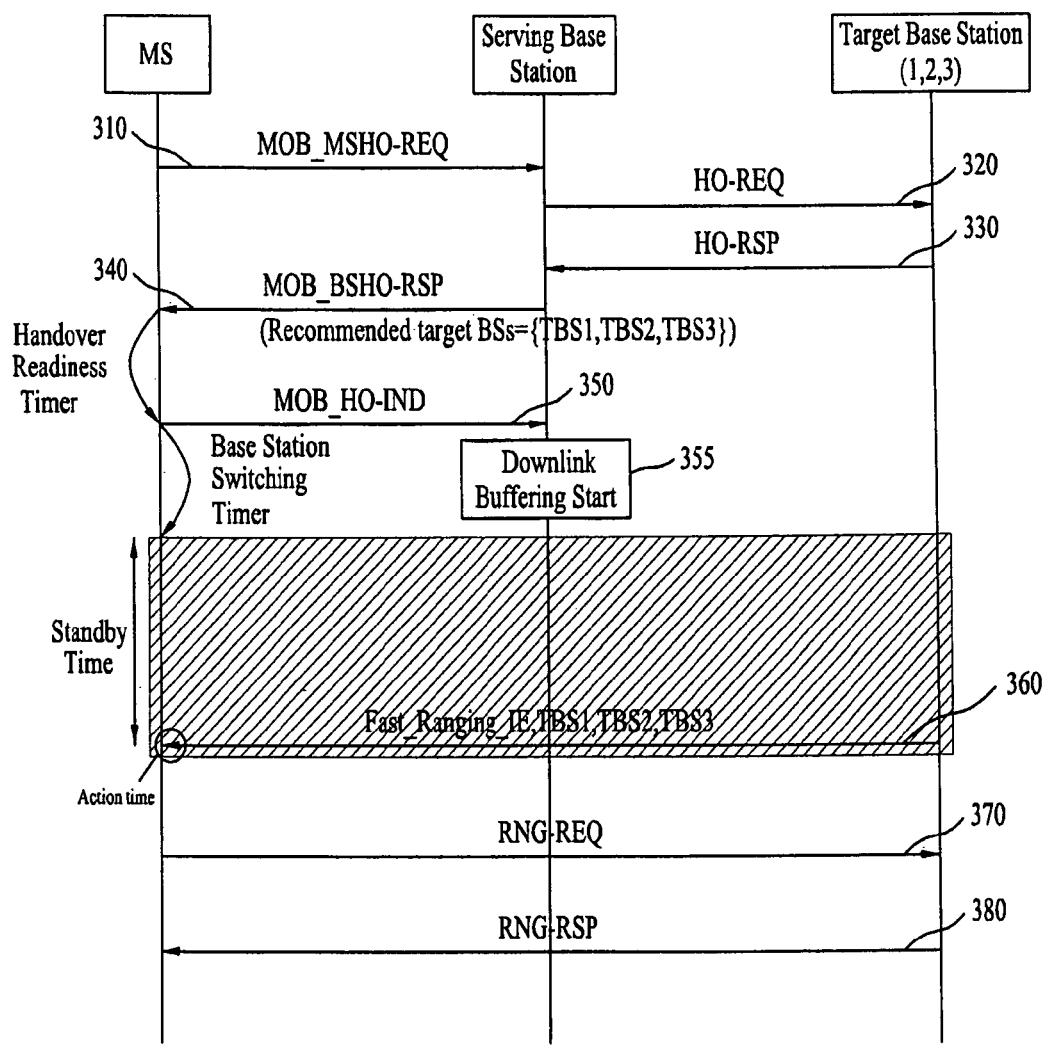
FIG. 3 is a diagram illustrating an unnecessary standby state occurring during a hard handover procedure.
Figure 4:
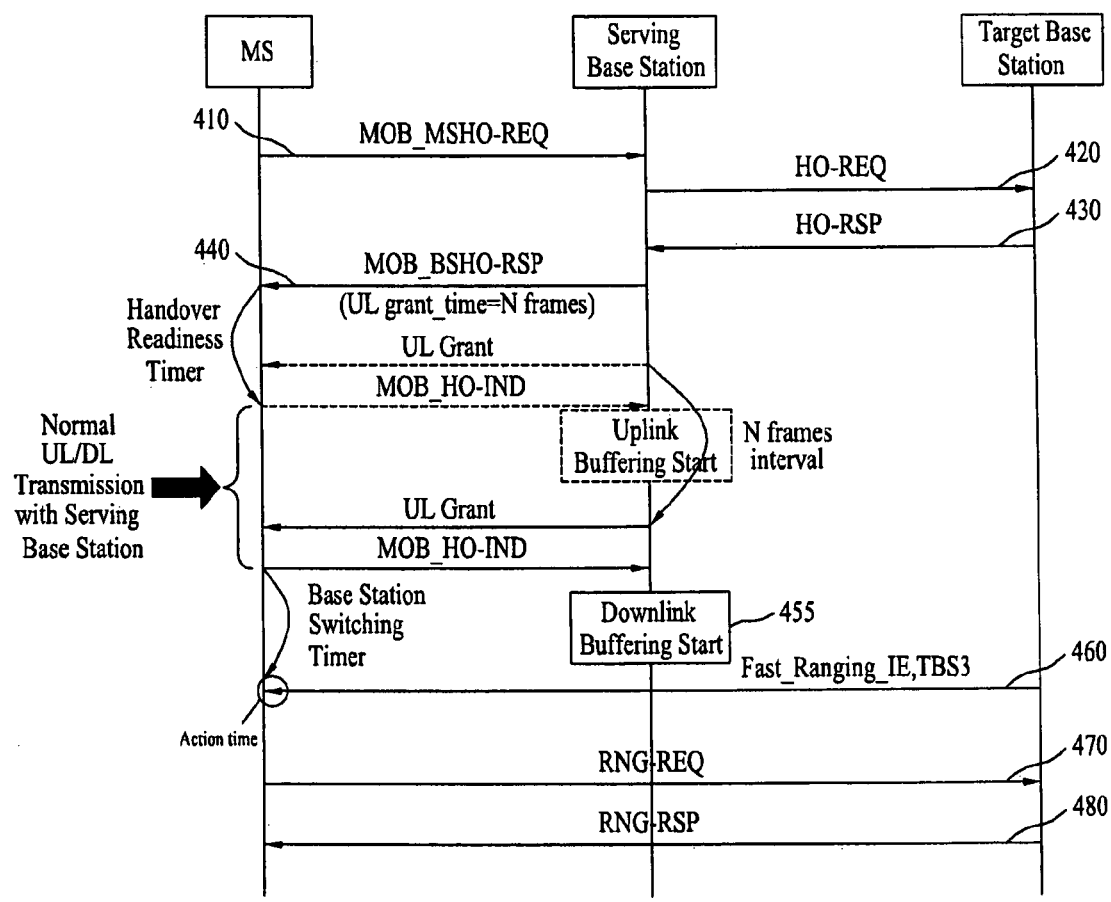
FIG. 4 is a diagram illustrating an example of a substantial procedure performed by a mobile station to adapt to a grant time in an IEEE 802.16m network.

FIG. 4 is a diagram illustrating an example of a substantial procedure performed by a mobile station to adapt to a grant time (grant_time) in an IEEE 802.16m network.

Referring to FIG. 4, the mobile station transmits a handover request (MOB_MSHO-REQ) message to the serving base station (410). Then, the serving base station transmits a handover request (HO-REQ) message to a target base station (420) and receives a handover response (HO-RSP) message from the target base station (430).

Since the serving base station knows the action time, the serving base station can report information as to the time when the mobile station can continue to receive a service from the serving base station. The serving base station converts the time in a frame unit and transmits the handover response (MOB_BSHO-RSP) message through the grant recommended for fast handover. The mobile station selects the best target base station at its discretion and determines whether to perform handover. For example, the handover response (MOB_BSHO-RSP) message includes information as to whether preamble of each target base station can be supported or how handover (HO) optimization can be supported.

Table 1 illustrates corrected parts of the handover response (MOB_BSHO-RSP).

TABLE 1

| Syntax | Size (bit) | Notes |
|---|---|---|
| MOB_BSHO-RSP_Message_format( ) { | — | — |
| Management Message Type = 58 | 8 | — |
| Mode | 3 | 0b000: HO request |
|  |  | 0b001: MDHO/FBSS request |
|  |  | 0b010: MDHO/FBSS request |
|  |  | 0b011: MDHO/FBSS request |
|  |  | 0b100: MDHO/FBSS request |
|  |  | 0b101: MDHO/FBSS request |
|  |  | 0b111: MS HO request not recommended (BS in list unavailable) |
| Reserved | 2 |  |
| HO_IND_grant_time | 3 | Time, in number of frames, of expected UL grant from SBS to MS for the MOB HO-IND message. |
| . . . | . . . | . . . |
| } |  |  | time (grant_time), wherein the converted result is included in the handover response (MOB_BSHO-RSP) (440).

The mobile station should necessarily transmit the handover indication (MOB_HO-IND) message to the serving base station before performing substantial handover. To this end, the mobile station should be allocated with uplink (UL) grant from the serving base station. The grant time (grant_time) represents the time when the uplink grant is allocated to the mobile station by the serving base station.

Likewise, a downlink buffering time (455) of the serving base station is delayed as much as the grant time (grant_time). Although not shown, a buffering time of data to be transmitted from the mobile station to the uplink is delayed as much as the grant time (grant_time). In this case, the serving base station and the mobile station can continue to perform communication as much as the time when buffering is delayed.

As illustrated in FIG. 4, the grant time (grant_time) is set based on the time when a base station switching timer is performed and the time when a readiness procedure for buffering is performed.

After the grant time (grant_time) passes, the mobile station receives the uplink grant from the serving base station (445) and transmits the handover indication (MOB_HO-IND) to the serving base station (450).

After transmitting the handover indication (MOB_HO-IND), the mobile station receives a fast ranging information element from the target base station at the time when the base station switching timer ends (460).

Afterwards, the mobile station transmits a ranging request (RNG-REQ) to the target base station (470), and receives a ranging response (RNG-RSP) from the target base station (480).

The handover response (MOB_BSHO-RSP) message includes various kinds of information of target base stations In the embodiment of the present invention, a structure of newly corrected messages will be described below.

The handover response (MOB_BSHO-RSP) message is corrected to represent the action time according to maximum eight frame durations by allocating grant time (grant_time) 3 bits among current reserved regions of 5 bits. 3 bits allocated as the grant time (grant_time) are only exemplary, and can be varied if necessary.

The mobile station identifies the time when uplink grant for transmitting the handover indication (MOB_HO-IND) message will be received, through the grant time (grant_time).

The mobile station continues to receive a service from the serving base station until the identified time. If there are any data to be transmitted to an uplink, the mobile station starts buffering to adapt to the grant time (grant_time). The buffered data are continuously transmitted after handover to the target base station.

Figure 5:
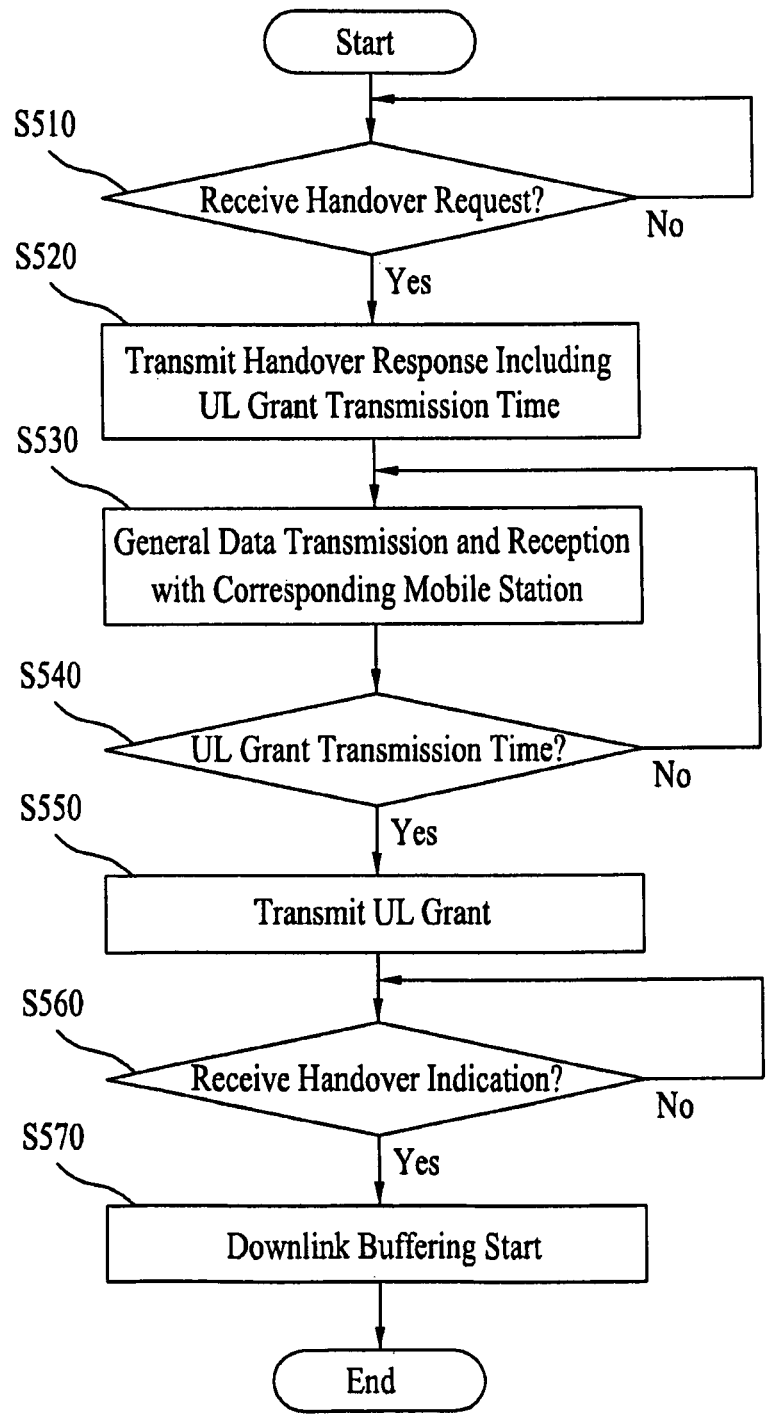
FIG. 5 is a flow chart illustrating a method for performing handover according to one embodiment of the present invention.

FIG. 5 is a flow chart illustrating a method for performing handover according to the embodiment of the present invention.

The mobile station transmits the handover request message to the base station. If the handover request message is received from the mobile station (S510), the base station transmits the handover response message to the mobile station, wherein the handover response message includes the uplink grant time (S520).

Next, the mobile station and the base station maintain data communication until the uplink grant time comes (S530). Namely, the mobile station and the base station perform general data transmission and reception.

If the uplink grant time comes (S540), the base station transmits the uplink grant to the mobile station (S550). The mobile station which has received the uplink grant transmits the handover indication message to the base station.

If the handover indication message is received (S560), the base station starts downlink buffering for the data to be transmitted to the mobile station (S570).

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention relates to a method for performing handover, which can reduce an unnecessary interruption time during hard handover by efficiently improving use of an action time, and an action suitable for a frame structure of the IEEE 802.16m can be performed. The present invention can be applied to the base station and the mobile station of the IEEE 802.16m.

The invention claimed is:

1. A method for performing handover at a mobile station of a wireless communication system, the method comprising:
   transmitting a first message for requesting handover to a base station;
   receiving a second message from the base station in response to the first message, the second message including information on a first time duration, information on an offset and information on a plurality of target base stations, wherein the offset is a delay time in frame units;
   transmitting a third message including information of a selected target base station among the plurality of target base stations to the base station before expiration of a second time duration; and
   receiving a fast ranging information element from the selected target base station for handover at a time determined based on the first time duration,
   wherein data communication with the base station is stopped at expiration of the second time duration, and
   wherein the second time duration is derived from the information on the first time duration and the information on the offset.

2. The method of claim 1, further comprising the mobile station disconnecting from the base station before performing network reentry with the selected target base station.

3. A method for performing handover at a base station of a wireless communication system, the method comprising:
   receiving a first message for requesting handover from a mobile station;
   transmitting a second message to the mobile station in response to the first message, the second message including information on a first time duration, information on an offset and information on a plurality of target base stations, wherein the offset is a delay time in frame units; and
   receiving a third message including information of a selected target base station among the plurality of target base stations from the mobile station before expiration of a second time duration,
   wherein the first time duration is used for indicating a time at which the mobile station receives a fast ranging information element from the selected target base station for handover,
   wherein data communication with the mobile station is stopped at the expiration of the second time duration, and
   wherein the second time duration is derived from the information on the first time duration and the information on the offset.

4. The method of claim 3, further comprising starting downlink buffering when a handover indication message is received from the mobile station or at the expiration of the second time duration.

5. The method of claim 3, wherein the second time duration is derived by subtracting the offset from the first time duration when the mobile station starts to perform network reentry to the selected target base station.

6. The method of claim 3, wherein downlink data transmission and uplink resource allocation are stopped at the expiration of the second time duration.

* * * * *